No. 733,629. PATENTED JULY 14, 1903.
T. H. CURTIS.
RAFTING DOG.
APPLICATION FILED APR. 25, 1903.
NO MODEL. 2 SHEETS—SHEET 2.

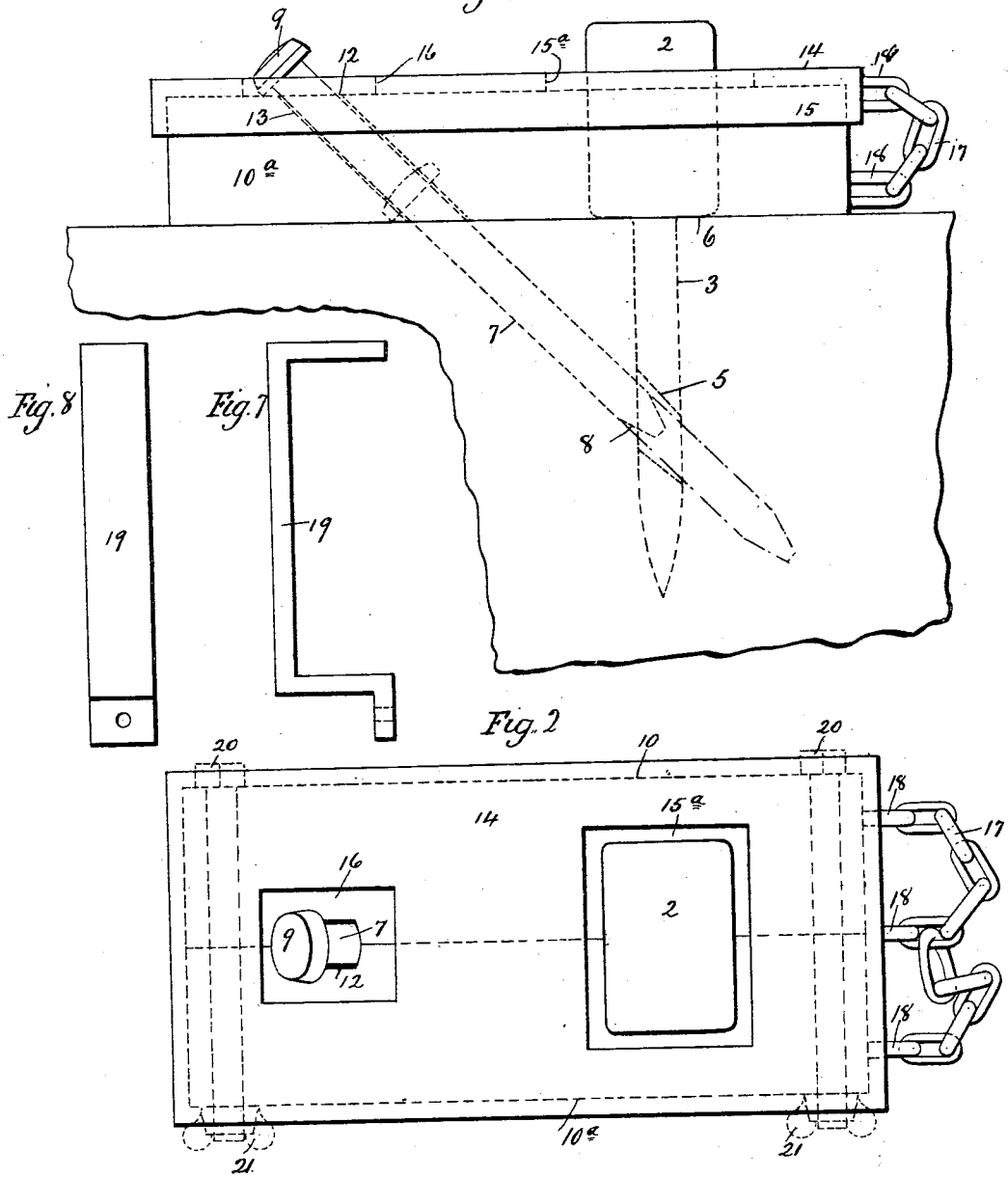

Witnesses.
J. H. Shumway
Clara L. Weed.

Thomas H. Curtis
Inventor
By attys Seymour & Earle

No. 733,629. Patented July 14, 1903.

UNITED STATES PATENT OFFICE.

THOMAS H. CURTIS, OF ASTORIA, OREGON.

RAFTING-DOG.

SPECIFICATION forming part of Letters Patent No. 733,629, dated July 14, 1903.

Application filed April 25, 1903. Serial No. 154,233. (No model.)

*To all whom it may concern:*

Be it known that I, THOMAS H. CURTIS, of Astoria, in the county of Clatsop and State of Oregon, have invented a new and useful Improvement in Rafting-Dogs; and I do hereby declare the following, when taken in connection with the accompanying drawings and the letters of reference marked thereon, to be a full, clear, and exact description of the same, and which said drawings constitute part of this specification, and represent, in—

Figure 3:
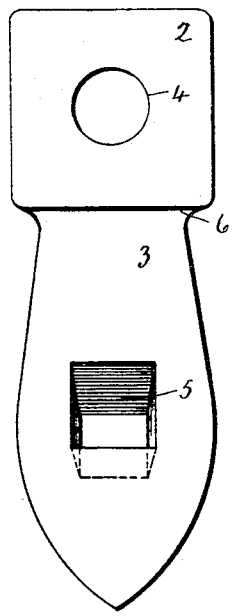
Figure 4:
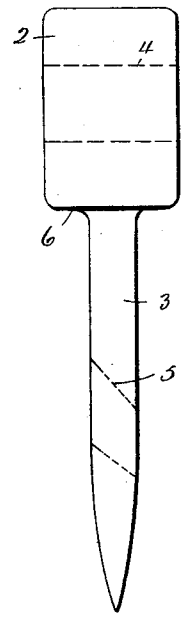
Figure 5:
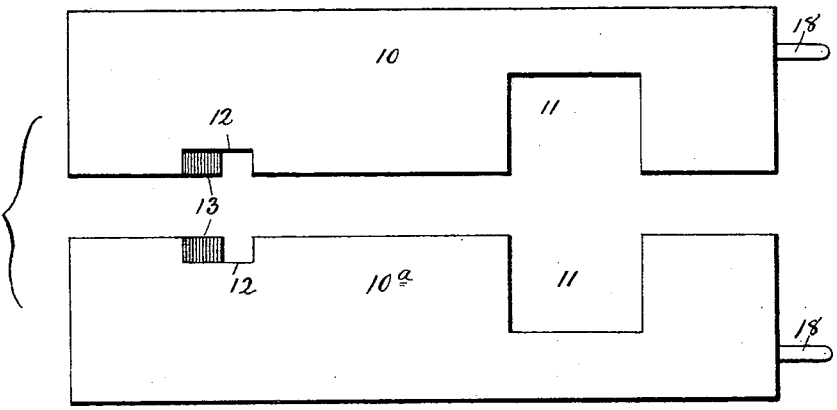
Figure 6:
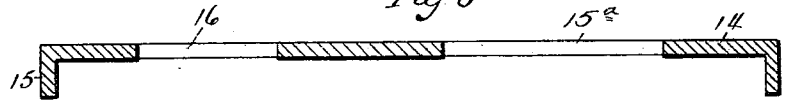

Figure 1, a view in side elevation of my improved rafting-dog and retaining-spike, together with the one form which the means for supporting and guiding the spike may assume; Fig. 2, a plan view of the same construction; Fig. 3, a detached front view of the dog; Fig. 4, a corresponding edge view thereof; Fig. 5, a detached view of the two-part supporting and guiding yoke; Fig. 6, a detached view in vertical longitudinal section of the yoke binder; Fig. 7, a view in side elevation of another form of yoke-binder; Fig. 8, a plan view thereof.

My invention relates to an improvement in lumbering appliances, and more particularly to the rafting-dogs used in tying together rafts of logs, the object being to provide for preventing these dogs from being pulled away from the logs under the heavy strain to which they are subjected.

With these ends in view my invention consists in a rafting-dog having its shank formed with an obliquely-arranged transverse hole for the reception of a retaining-spike and having its head formed with a hole for the reception of a chain or cable.

My invention further consists in the combination, with a rafting-dog having its shank formed with a transverse obliquely-arranged spike-receiving hole, of a spike and means for supporting and guiding the spike in being entered into the log at the right inclination to insure the passage of its inner end through the said spike-receiving hole.

My invention further consists in certain details of construction and combinations of parts, as will be hereinafter described, and pointed out in the claims.

In carrying out my invention I employ a rafting-dog comprising a heavy rectangular head 2 and a flat-pointed shank 3, the head being furnished with a hole 4 for the passage through it of a chain or cable and the shank being formed with a transverse obliquely-arranged tapering spike-receiving hole 5, longer at its upper than at its lower end. The head 2 is also formed with a stop-shoulder 6, which limits the distance to which the dog may be driven into a log, whereby the position of its spike-receiving hole 5 is always the same with respect to the surface of the log. As shown, the head 2 of the dog is rectangular; but this is not necessary. Preferably the head, whatever its form, should be formed with some kind of a stop-shoulder for the purpose described. To prevent the dog from being pulled out of a log by the outward pull of the chain or cable passed through its hole 4, I employ a dog-retaining spike 7, having a pointed end 8 and a head 9 and made rectangular, round, or of other cross-sectional form to correspond to the shape of the spike-receiving hole 5, which is shown to be rectangular, but which may have any other desired shape.

It will be understood that the dog is first driven into a log and then locked therein by means of the spike. Now in order to drive the spike into a log so that when driven home therein its inner portion shall certainly pass through the spike-receiving hole of the dog I employ some spike supporting and guiding appliance which may take various forms. As herein shown, it consists of a two-part yoke the members 10 10ª of which correspond to each other, each part being provided upon its inner edge with a rectangular clearance-cut 11. These two clearance-cuts 11 adapt the two parts of the yoke to be snugly fitted around the rectangular head 2 of the dog, as shown in Fig. 2. Each part of the yoke is also formed with a clearance-cut 12. These two cuts 12 adapt the two parts of the yoke to clear the head of the spike and are formed with inclined bottom walls 13, the pitch or inclination of which corresponds to the pitch or inclination of the center of the spike-receiving hole 5. The spike being entered into the log through the cuts 12 and supported upon the inclined walls 13 is given the right direction for the certain passage, when it is driven home, of its point through the spike-receiving hole 5 in the shank of the dog, which at this time occupies a fixed relation to the yoke. As shown, the yoke is clamped upon the head of the dog by means of a cover-like yoke-binder consisting of an oblong rectangular plate 14, having an integral depending flange 15, which latter embraces the upper edges of the ends and the sides of the two yoke members 10 10ª. The said binder is formed with a clearance-opening 15ª for the head of the dog and a corresponding but smaller clearance-opening 16 for the upper end and head of the spike. In order to keep the two yoke members and the binder together for convenience in use and to prevent their loss, they are connected by means of a chain 17 and three staples 18. It will be understood, of course, that after the spike has once been started into the log in the right direction by the use of the guiding and supporting means described the same are removed, after which the spike is driven the rest of the way, as shown by broken lines in Fig. 1.

Instead of using such a yoke-binder as described for holding the two parts of the yoke together, I might employ two simple clamps 19 of the form shown in Figs. 7 and 8 or two bolts 20, provided with thumb-nuts 21, as shown by broken lines in Fig. 2.

In view of the modifications suggested and of others which may obviously be made, I would have it understood that I do not limit myself to the particular construction shown and described, but hold myself at liberty to make such departures therefrom as fairly fall within the spirit and scope of my invention.

Having fully described my invention, what I claim as new, and desire to secure by Letters Patent, is—

1. A rafting-dog having its shank formed with an obliquely-arranged, transverse hole for the reception of a retaining-spike and having its head formed for the connection with it of a chain or cable.

2. A rafting-dog having its shank formed with an obliquely-arranged, transverse hole for the reception of a retaining-spike, and having its head formed with a stop-shoulder, and with a hole for the reception of a chain or cable.

3. The combination with a rafting-dog having its shank formed with a spike-receiving hole, and its head with a stop-shoulder and with a hole, of a spike, and means for supporting and guiding the spike in being entered into the log at the right inclination to insure the passage of its inner end through the said spike-receiving hole.

4. The combination with a rafting-dog having its shank formed with a spike-receiving hole, of a spike, a two-part yoke adapted to clear the head of the dog and the spike, and means for binding the two parts together while the same is in use for supporting and guiding the spike in being entered into the log at the right inclination to insure the passage of its inner end through the said spike-receiving hole.

5. The combination with a rafting-dog having its shank formed with a spike-receiving hole, of a spike, a two-part yoke each part of which is formed with clearance-cuts for the head of the dog and for the spike, and a yoke-binder for binding the two parts of the yoke together while the same is in use for supporting and guiding the spike in being entered into a log at the right inclination to insure the passage of its inner end through the spike-receiving hole.

6. The combination with a rafting-dog having its shank formed with a spike-receiving hole, of a spike, a two-part yoke adapted to clear the head of the dog and the spike, and a cover-like yoke-binder for binding the two parts of the yoke together while the same is in use for supporting and guiding the spike in being entered into a log at the right inclination to insure the passage of its inner end through the spike-receiving hole.

7. The combination with a rafting-dog having its shank formed with a transverse, obliquely-arranged spike-receiving hole and having its head formed with a hole for the reception of a chain or cable and with a stop-shoulder, of a spike, a two-part yoke adapted to clear the head of the dog and spike, and a yoke-binder.

In testimony whereof I have signed this specification in the presence of two subscribing witnesses.

THOMAS H. CURTIS.

Witnesses:
 CLARA L. WEED,
 GEORGE D. SEYMOUR.